No. 879,663. PATENTED FEB. 18, 1908.
D. McIVOR.
SPARK ARRESTER.
APPLICATION FILED JAN. 5, 1907. RENEWED SEPT. 13, 1907.
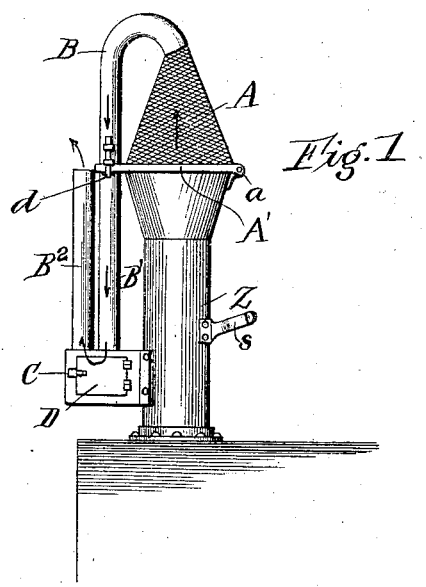
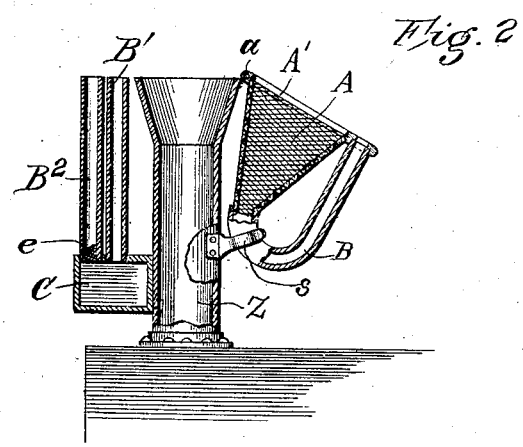
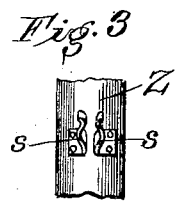
WITNESSES
INVENTOR
DANIEL McIVOR
BY
ATTORNEYS

UNITED STATES PATENT OFFICE.

DANIEL McIVOR, OF HUMBOLDT, MINNESOTA.

SPARK-ARRESTER.

No. 879,663.      Specification of Letters Patent.      Patented Feb. 18, 1908.

Application filed January 5, 1907, Serial No. 350,865. Renewed September 13, 1907. Serial No. 392,763.

*To all whom it may concern:*

Be it known that I, DANIEL McIVOR, a citizen of the United States, residing at Humboldt, in the county of Kittson and State of Minnesota, have invented a new and useful Improvement in Spark-Arresters, of which the following is a specification.

My invention is in the nature of a spark arrester designed more particularly for traction and portable agricultural engines but applicable to all sorts of engines.

Fires resulting from flying sparks of an engine are especially liable to occur when engines are used about the barn or pound yard owing to the combustible nature of the straw, hay or other inflammable material found in such places and a simple and conveniently adjusted spark arrester for this use is a great desideratum. Spark arresters which comprehend a wire gauze funnel connected by a goose-neck pipe to a subjacent trap chamber have heretofore been employed, but such devices as now constructed choke the draft when first kindling the fire.

My invention is designed to provide a spark arrester, of this type which may be conveniently thrown back out of the way in kindling the fire, so that the draft may not be impeded and be afterwards turned down again into operative position to restrain the sparks when the engine is at work as hereinafter fully described with reference to the drawings, in which Figure 1 is a side elevation with the spark arrester closed. Fig. 2 a vertical section with it open, and Fig. 3 is a detail showing holder for strainer cone when open.

In the drawing, Z represents the smoke stack of a traction, or farm engine, a locomotive, or any other similar engine.

To compensate for the choking effect of the strainer, the smoke stack is made with a flared or funnel shaped top. On to this is fitted the conical strainer A of woven wire, the base of the cone being of the same diameter as the top of the stack, and being reinforced by a marginal ring of metal A' which is hinged to the top of the stack at $a$. From the top of the cone there descends a goose-neck pipe B which terminates on the level of the bottom of the conical strainer on the opposite side from the hinge.

To the front of the stack is bolted a trap box C, from which rise two stand pipes B' B². B' is of the same size as the goose-neck pipe B above, and the upper end of pipe B' registers or coincides with the bottom end of the goose-neck and a suitable catch $d$ is provided for holding the cone and goose-neck firmly in this closed position, as in Fig. 1, but allowing it to be turned back as seen in Fig. 2 when first kindling the fire.

From the trap box an escape pipe B² rises to any desired point and across this pipe near the trap box a strainer partition of woven wire $e$ is arranged to prevent the blast from blowing the accumulated cinders out of the box. At one side of the trap box a suitable door D is placed through which the cinders may be removed from time to time.

The device as thus described forms a very efficient spark arrester which may be made effective or be thrown out of use as may be desired in an easy, quick and convenient manner.

To hold the conical strainer cap, when open, two spring jaws $s$ $s$, Fig. 3, are riveted to the back of the smoke stack, between which jaws the goose-neck pipe is received and held, as in a seat, as shown in Fig. 2, to hold it steady and relieve the hinge of strain.

I claim

1. A spark arrester, comprising a wire screen made in the form of a cone having at its base a marginal ring and a hinge and having a goose-neck pipe extending from the top of the cone down to and terminating on a line with the base of the cone on the opposite side from the hinge in combination with a fixed pipe registering with the bottom of the goose-neck pipe, and a trap box at the lower end of the pipe having an escape vent.

2. The combination with a smoke stack having a funnel-shaped upper end; of a conical wire screen having a marginal ring at the base hinged to the top of the smoke stack and having at the top of the conical screen a goose-neck pipe dipping down to and terminating at the base of the cone on the opposite side from the hinge, a fixed trap box having a pipe extending up to and registering with the goose-neck pipe and a vent outlet.

3. The combination with a smoke stack having a funnel-shaped upper end; of a conical wire screen having a marginal ring at the base hinged to the top of the smoke stack and having at the top of the conical screen a goose-neck pipe dipping down to and terminating at the base of the cone on the opposite side from the hinge, a fixed trap box having two stand-pipes, one extending up to and registering with the bottom of the goose-neck pipe and the other extending upwardly and having a screen partition in the same.

DANIEL McIVOR.

Witnesses:
T. B. BROWN,
EDWARD FLORANCE.